United States Patent
VandenBerg

(10) Patent No.: US 7,218,268 B2
(45) Date of Patent: May 15, 2007

(54) SELF-CALIBRATING INTERFEROMETRIC SYNTHETIC APERTURE RADAR ALTIMETER

(75) Inventor: Norman VandenBerg, Linden, MI (US)

(73) Assignee: Veridian Systems, Ann Arbor, MI (US)

(*) Notice: Subject to any disclaimer, the term of this patent is extended or adjusted under 35 U.S.C. 154(b) by 426 days.

(21) Appl. No.: 10/437,836

(22) Filed: May 14, 2003

(65) Prior Publication Data

US 2004/0227658 A1 Nov. 18, 2004

(51) Int. Cl.
*G01S 13/08* (2006.01)

(52) U.S. Cl. .............. 342/25 R; 342/25 E; 342/120; 342/123; 342/135

(58) Field of Classification Search .............. 342/25, 342/38, 63–65, 80, 120–123, 127, 128, 140, 342/149, 156, 157, 165, 124, 190–191, 25 R
See application file for complete search history.

(56) References Cited

U.S. PATENT DOCUMENTS

| | | | | |
|---|---|---|---|---|
| 4,387,373 A | * | 6/1983 | Longuemare, Jr. ............ | 342/25 |
| 5,659,318 A | * | 8/1997 | Madsen et al. ................ | 342/25 |
| 5,966,092 A | * | 10/1999 | Wagner et al. ................ | 342/70 |
| 6,118,402 A | * | 9/2000 | Kupfer ........................ | 342/149 |
| 6,175,326 B1 | * | 1/2001 | Kare ........................... | 342/25 |
| 6,384,766 B1 | * | 5/2002 | Ulander ....................... | 342/25 |
| 6,396,437 B1 | * | 5/2002 | Marino et al. ............... | 342/117 |

OTHER PUBLICATIONS

Skolnik, Merril I. "Introduction to Radar systems" Third Edition, 2001, pp. 213-224.*

* cited by examiner

*Primary Examiner*—Thomas H. Tarcza
*Assistant Examiner*—Isam Alsomiri
(74) *Attorney, Agent, or Firm*—Gifford, Krass, Groh, Sprinkle, Anderson & Citkowski, PC

(57) ABSTRACT

A synthetic aperture radar system uses RF bandwidth and Doppler beam sharpening principles to develop fine altitude and along-track resolutions. To achieve accurate cross-track position measurements the system and method exploit a combination of modes based on a novel antenna pattern combination. The unique arrangement of the antenna patterns allows the radar to process terrain elevation measurements in three independent modes, namely, time-delay response (TDR), amplitude monopulse (AM) and phase monopulse (PM). The additional modes address the interfering scatter problem and the calibration issues required for practical and cost effective operation. The approach also maximizes the number of terrain measurements made per look, thereby reducing the impact of errors and noise through averaging and "voting" (i.e., the comparison of measurements and discarding of "outliers").

16 Claims, 1 Drawing Sheet

SELF-CALIBRATING INTERFEROMETRIC SYNTHETIC APERTURE RADAR ALTIMETER

FIELD OF THE INVENTION

This invention relates generally to remote sensing and, in particular, to a radar system using a novel antenna pattern and multiple operational modes to develop an accurate location of a radar platform through three-dimensional terrain measurement and comparison to reference terrain data.

BACKGROUND OF THE INVENTION

In synthetic aperture radar (SAR), the relative motion between a platform such as an aircraft and a scene of interest is exploited to achieve greater angular resolution than that obtainable in a non-SAR system. The motion of the aircraft permits formation of a synthetic antenna that is larger in size than the real antenna. This large synthetic antenna has an angular resolution corresponding to the angular resolution of an equally large physical antenna. The aircraft flies in a predetermined path and repeatedly transmits a radar signal. It is typical for this radar signal to be directed to the side of the flight path via a small antenna. This cross-track view may be directly perpendicular to the flight path or at some angle less than perpendicular. The same antenna receives return echoes of the transmitted signal.

The return echo signals are processed in two dimensions. The time to receive an echo return from any particular piece of terrain corresponds to its slant range from the aircraft. This range is called slant range because it typically follows a downwardly slanting path from the aircraft to the ground. The echo returns also have differing Doppler frequencies. The motion of the aircraft imparts a Doppler frequency shift in the echo returns from the stationary ground. Areas directly ahead of the aircraft have a maximum closing Doppler frequency, those directly behind have a maximum opening Doppler frequency. Areas at varying angles between these extremes have intermediate Doppler frequencies. The combination of time of return and Doppler frequency permit production of a two dimensional feature map of resolution cells. Plural echo returns can be processed together with the known path and velocity of the aircraft to produce a terrain map.

A problem with this technique is that it produces a position ambiguity. An echo signal with a particular time of return and Doppler frequency does not define a unique location. Regions of echo return times equal within the limits of measurement lie on a spherical shell centered at the antenna location. Regions of Doppler frequencies equal within the limits of measurement lie on a conical shell having its vertex at the antenna and its axis on the velocity vector of the aircraft. The intersection of these regions forms a vertically disposed circular annulus. Actual echo returns can only come from areas illuminated by the transmissions, so that the return areas are further limited to the solid angle cone of the antenna. Still this leaves an ambiguity in the location of the terrain forming the echo return. Terrain features having greater elevations are foreshortened because they have a reduced slant range compared with to regions of lower elevation.

Richman, U.S. Pat. No. 4,321,601, issued Mar. 23, 1982 and entitled "THREE DIMENSIONAL AZIMUTH-CORRECTING MAPPING RADAR" proposes a solution to this terrain elevation ambiguity problem. Richman employs two synthetic aperture radar antennas disposed a known distance apart on the aircraft. The antennas have the same look angles to cover the same terrain. Each antenna has its data processed in both slant range and Doppler frequency to identify and correlate echo returns from the same portions of terrain in the two antennas. The phase difference between the echo returns of the two antennas for the same resolution cell corresponds to the slant angle to the location producing that echo. Simple trigonometry permits computation of terrain elevation for a particular echo return from the slant angle, the known altitude of the aircraft and the measured slant range.

The technique of Richman measures the difference in slant range between the respective antennas and the target location by measuring the phase difference of the echo returns. The phase difference measurement introduces a $2\pi$ ambiguity. That is, the actual slant range difference could include one or more factors of $2\pi$ while yielding the same phase difference. This circular phase ambiguity produces an ambiguity in the terrain elevation calculated by this technique. A known technique called phase unwrapping can be used to reduce this ambiguity. The phase unwrapping technique requires a good signal to noise ratio and well behaved terrain yet still produces a bias ambiguity over the entire terrain mapped. There is a need in the art to provide a manner of reducing or eliminating the measurement ambiguity introduced in this interferometric determination of the terrain elevation.

According to U.S. Pat. No. 5,485,907, an airborne SAR system for determining the topography of a terrain uses two switchable antenna patterns, which can be generated by means of a monopulse antenna. Using this approach, two completely correlated SAR images of different amplitude modulation in the cross-track direction are obtained and registered, with the desired terrain information being extracted from the amplitude relationship of the two SAR images, for example by means of an amplitude interferometer. In this case the antenna patterns generated by means of the monopulse antenna are a sum and a difference pattern. It is also possible to extract the terrain information from the polarimetric SAR data by means of cross-talk parameters.

The monopulse antenna is formed from a plurality of individual radiators divided into upper and lower halves which are essentially mirror-symmetrical in relation to their division. To generate a sum and a difference pattern, summed radiators in the upper and the lower antenna halves are combined in phase or 180 degrees out of phase. Thus, two images of one and the same area are necessary for realizing an amplitude interferometer, which are modulated in the elevation direction with different antenna patterns, namely a sum pattern and a difference pattern. If now an image is generated from the quotient of these two original images, the image resulting therefrom has a modulation which is a function of the antenna angle and corresponds to the relationship of the two antenna patterns. From a knowledge of the antenna angle, the nadir angle may be derived, and by adding the measured, known slant range, the flight altitude above the respective image area may be determined. If the flight altitude above mean sea level (m.s.l.), or the absolute altitude of an image element is known, a map of flight altitudes can be inverted and used to generate a topographic map in the slant range geometry of the radar.

SUMMARY OF THE INVENTION

This invention broadly resides in a radar system using RF bandwidth and Doppler beam sharpening (i.e., SAR) principles to develop fine range and along-track resolutions.

Operating as an altimeter, the radar antenna is oriented downward along the nadir so that altitude can be measured with precision corresponding to the radar range resolution. High altitude measurement accuracy is supported by a high quality master clock typical of modern radar systems. Along-track measurement precision corresponds to the along-track SAR resolution with accuracy corresponding to accurate estimation of the platform velocity that can be derived from the data.

To achieve accurate cross-track position measurements the system and method exploit a combination of modes based on a novel antenna pattern combination. The unique arrangement of the antenna patterns allows the radar to process terrain elevation measurements in three independent modes, namely, Time-Delay Response (TDR), Amplitude Monopulse (AM) and Phase Monopulse (PM).

The additional modes address the interfering scatter problem and the calibration issues required for practical and cost effective operation. The approach also maximizes the number of terrain measurements made per look, thereby reducing the impact of errors and noise through averaging and "voting" (i.e., the comparison of measurements and discarding of "outliers").

DETAILED DESCRIPTION OF THE INVENTION

Figure 1:
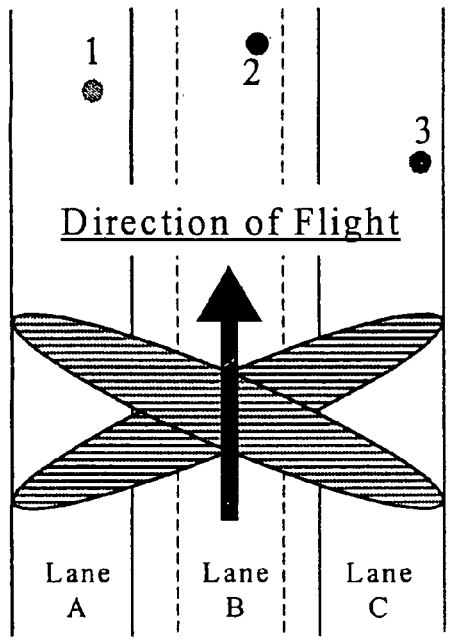
FIG. 1 illustrates antenna footprints on a terrain below an altimeter according to the invention.

As discussed in the Background, this invention is directed to a radar system using RF bandwidth and Doppler beam sharpening interferometric synthetic aperture radar (IFSAR) principles to develop fine altitude and along-track resolutions, with resolutions on the order of ~1 m or better anticipated. To assist the reader, the following glossary should prove beneficial:

DEM: Digital Elevation Model
DTED: Digital Terrain Elevation Data
ECM: Electronic Countermeasures
GPS: Global Positioning System
IFSAR: Interferometric Synthetic Aperture Radar
INS: Inertial Navigation Sensor
MMW: Millimeter Wave (typically 35 and 94 GHz)
SAR: Synthetic Aperture Radar
SCISAR: Self-Calibrating Interferometric Synthetic Aperture Radar
SNR: Signal to Noise Ratio In addition, the following table will be used to review the features and benefits of various altimeter approaches. The inventive approach is called the SCISAR (Self-Calibrating Interferometric Synthetic Aperture Radar) Altimeter.

| Altimeter Class | Features | Advantages | Disadvantages | Assessment |
|---|---|---|---|---|
| Standard Altimeter | MMW frequency (Ka- or W-band) Real beam horizontal both along- and across-track | Simple hardware Minimal processing for horizontal resolution | Low altitude only High weather attenuation Coherence difficult Costly components/manufacturing High power transmitter (for MMW band) Scanning req'd for DEM swath | No cost benefit, possible penalty Weather sensitivity Inadequate for higher altitude |
| Monopulse Altimeter | MMW frequency Real beam resolution Measures location of first return along/across track within the beam footprint | Simple hardware Minimal processing Better precision than Standard Altimeter | Same as other MMW issues Low precision- Tracks centroid of scatters in res cell Difficult to maintain calibration | Cost penalty Weather sensitivity Inadequate to meet the most demanding requirements |
| Doppler Beam Sharpened Altimeter | Lower frequency Fine resolution along-track Real-beam resolution across-track | Better precision than Standard Altimeter (along track resolution) | Altitude sensitive More complex processing Poor cross-track resolution | Inadequate to meet the most demanding requirements |
| Doppler Beam Sharpened Interferometrc Altimeter (DBSIA) | Fine resolution along-track Precision cross-track measurements | Precision measurements X-band insensitive to weather & smoke Low cost hardware | Tracks centroid of scatterers in res cell Difficult to maintain calibration | Signal processing intensive Low production cost (COTS technology) |
| Self-Calibrating Interferometrc Synthetic Aperture | Unique antenna configuration enables multiple-mode processing of common data | Precision measurements Maximal measurements per DEM area- | Signal processing complexity | The "hard" problem (signal processing) exploits the most rapidly advancing technology |

-continued

| Altimeter Class | Features | Advantages | Disadvantages | Assessment |
|---|---|---|---|---|
| Radar (SCISAR) Altimeter | Synergistic processing of data for all modes | benefits of averaging Multiple modes mitigate errors- "voting" and self-calibration X-band insensitive to weather & smoke Low cost hardware | | Low production cost (COTS technology) Low logistics cost (self-calibrating) |

For the accurate cross-track position measurements, the system and method described herein uses use a combination of modes based on a novel antenna pattern combination. The unique arrangement of the antenna patterns, allows the radar to process terrain elevation measurements in three independent mode, namely Time Delay Response (TDR), Amplitude Monopulse (AM) and Phase Monopulse (PM).

The PM mode is equivalent in nature to the DBSIA mode listed in the above table. The two additional modes address the interfering scatter problem and the calibration issues required for practical and cost effective operation of the altimeter. This unique approach also maximizes the number of terrain measurements made per look and further reduces the impact of errors and noise through averaging and "voting" (comparison of measurements and discard of outliers).

FIG. 1 illustrates the antenna footprints on the terrain below the altimeter. Doppler processing of each channel and selective timing and filtering defines three terrain sampling lanes A,B,C As the sensor flies along the flight path, scatterers appear in range bins according to their elevation. For illustration purposes an isolated scatterer is depicted in each lane at different along-track locations.

Figure 2:
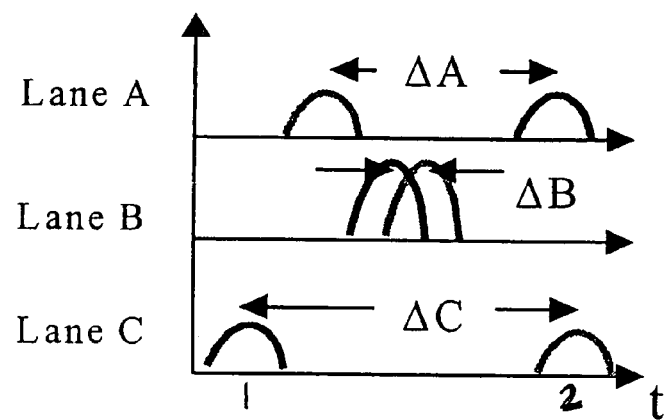
FIG. 2 helps to explain the TDR mode.

The TDR mode can be understood by examining the diagram of FIG. 2. Starting at the top by examining lane A, note that Scatterer 1 appears first in Channel 1 and later in Channel 2 delayed by ΔA in time. ΔA is determined by both the speed of flight and the cross-track position of Scatterer 1 within Lane A. There is a basic ambiguity between the speed and cross track position for this mode; however, the timing measurements obtained for the other lanes together with use of the reference DTED provides the means to eliminate the uncertainty and estimate speed (also available from the platform sensors, and GPS, if available). Lane B operates in a similar fashion except the scatterer arrives nearly simultaneously in each channel and for Lane C the order is reversed.

The PM mode is the conventional phase-based interferometer (IFSAR) mode. In Lane B, the processing of the channels is simultaneous. Synthetic apertures for Lane A, Channel 1 and Lane C, Channel 2 are produced at the same time since these regions are separated by Doppler shifts. Lane A, Channel 2 and Lane C, Channel 1 are produced as separate synthetic apertures delayed to observe the same segments of the DTED as imaged in the complementary channels. "First returns" are selected out of the range (altitude) information in the images and phase comparisons are made to measure the cross-track positions of the scatterers.

The AM mode is implemented by the introduction of a small misalignment in the two antenna patterns. This creates an amplitude ratio variation for a dominant scatterer as a function of its cross-track position in each lane. Measurement of the amplitude ratio thus provides an independent measurement of cross-track position that is insensitive to phase. The pattern misalignment is created synthetically by processing synthetic apertures with additional delay to create the antenna pattern shift. This is made possible by the unique pattern layout of the SCISAR altimeter. This introduces a slight increase in signal processing load depending on the overlap with the PM mode apertures. The optimum approach is a trade between AM mode performance and processing load.

In order to operate at extremely low altitudes, the radar will operate in a transmit-while-receive condition. A single broadbeam transmit antenna is used for illumination of the terrain. The receive antenna assembly may be modified to accommodate the additional IFSAR phase centers and the beam shape factors.

One of the benefits of the Doppler processing approach to the altimeter is to make performance less sensitive to altitude. At extremely low altitudes it becomes more difficult to operate in this mode simply because the speed of the vehicle does not allow for a substantial synthetic aperture. At these altitudes, the sensor behaves more like a real beam system that is reasonably well matched to available resolution. A higher frequency sensor would have too much resolution at low altitude. The sensor will actually be too close to provide much sampling in the cross-track dimension.

Accordingly, as altitude is increased, the mode of operation will preferably transition to one relying more heavily on Doppler processing for maintaining suitable performance. The selection of frequency and antenna patterns will be a strong factor influencing the behavior of the transition and performance in this zone. At higher altitudes, Doppler processing and precision cross-track measurements are key to maintaining dense enough sampling of the available DTED to achieve the most demanding performance objectives. It is also at these altitudes that the signal processing burden is greatest.

The issue of calibration is addressed by making use of the independent measurement mechanisms inherent in the concept. Primarily, it is the PM mode that requires calibration. However, this mode is expected to provide more precise operational measurements. The AM and TDR modes rely more directly on amplitude. The amplitude responses of the passive antennas are stable and the amplitude balance of the receiver channels can be calibrated based on a built-in test circuit.

In the self-calibration mode, the altimeter will search for isolated points in the terrain. These can be designated in advance based on the reference DTED or selected by built-in algorithms using observations on the altimeter images. The phase balance of the channels in the PM mode will be adjusted by comparison to the amplitude-based AM and TDR responses to achieve calibration. Subsequently, all three modes will operate in unison, combining complete DTED measurements (not just isolated points) to achieve the optimum performance.

To support adequate IFSAR phase-center separation, antenna gain, and the desired antenna patterns requires an aperture area of approximately one square foot, depending on frequency selection. The choice of frequency is driven by several factors including cost, frequency allocation, vulnerability to ECM, antenna footprint matching to the desired DTED swath coverage, weather performance, antenna gain (signal-to-noise ratio), motion compensation requirements, baseline length (in wavelength) for the PM modes, and isolation of scatterers for all SCISAR modes. Most of these factors tend to prefer a higher frequency than used by the common altimeters. Previous experiments were successfully performed at X-band with approximately 4-inch separation of the IFSAR phase centers. Frequencies as high as Ku-band are expected to be consistent with a practical implementation.

Figure 3:
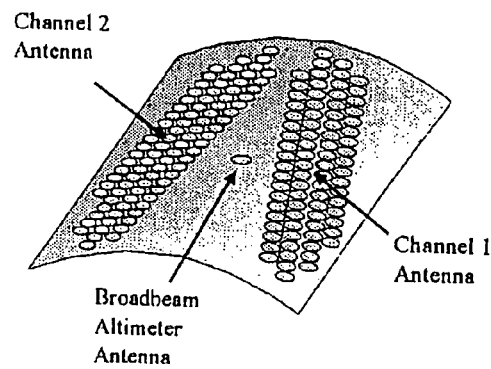
FIG. 3 is drawing of a preferred receive antenna without a protective radome coating.

FIG. 3 is a drawing of a notional SCISAR receive antenna without a protective radome coating. The volume requirement for this antenna is expected to be minimal (e.g., $\sim 1/16^{th}$ inch thickness) and so is not expected to present any unusual airframe internal volume or aerodynamic issues. The antenna will preferably be mounted conformal to an aircraft skin.

I claim:

1. A method of remotely sensing terrain elevation, comprising the steps of:
    sampling returns from radar scatterers associated with the terrain along multiple lanes using first and second channels that overlap to form a cross-shaped antenna pattern; and
    analyzing the returns to determine the elevation according to one or more or the following modalities:
        phase monopulse (PM),
        amplitude monopulse (AM), and
        time delay response (TDR).

2. The method of claim 1, wherein the PM mode is based upon interferometric Doppler beam-sharpening.

3. The method of claim 1, wherein the AM mode includes the step of misaligning the overlapping antenna patterns to create an amplitude ratio variation as a function of cross-track position in the sampling lanes.

4. The method of claim 1, wherein the TDR mode includes the step of using different channels to measure the time delay of scatterers within a common lane.

5. The method of claim 1, further including the step of increasing coherent integration time so as to maintain constant along-track resolution on the ground us the distance to the terrain increases.

6. In an interferometric synthetic aperture radar (IFSAR) system utilizing dual receive antennas, the improvement comprising:
    overlapping the antenna patterns to form a cross-shaped footprint enabling simultaneous terrain elevation measurement using one or more of the following modalities:
        phase monopulse (PM),
        amplitude monopulse (AM), and
        time delay response (TDR).

7. A method of remotely sensing terrain elevation, comprising the steps of:
    sampling returns from radar scatterers associated with the terrain along multiple lanes A, B, and C using first and second channels that form a cross-shaped antenna pattern that substantially overlaps in lane B; and
    analyzing the returns to determine the elevation according to one or more or the following modalities:
        phase monopulse (PM) using interferometric Doppler beam-sharpening,
        amplitude monopulse (AM) using an amplitude ratio variation as a function of cross-track position in the sampling lanes, and
        time delay response (TDR) using the first and second channels to determine the time delay of a scatterer in one of the lanes.

8. The method of claim 7, wherein the time delay is determined by both the speed of flight and the cross-track position of the scatterer tracked using TDR.

9. The method of claim 8, further including the step of using timing measurements obtained for the multiple lanes in conjunction with an external reference reference DTED to obtain a more accurate speed of flight.

10. The method of claim 9, wherein the external reference includes independently derived digital terrain elevation data (DTED).

11. The method of claim 9, wherein the external reference includes global positioning satellite (GPS) coordinates.

12. The method of claim 9, further including the step of increasing coherent integration time so as to maintain constant along-track resolution on the ground as the distance to the terrain increases.

13. A multi-mode altimeter system for use on a platform that moves relative to a terrain of interest, the system comprising:
    a multi-channel antenna operative to generate an overlapping, cross-shape pattern defining a first channel and a second channel; and
    a Doppler processor using selective timing and filtering to perform elevation measurements along three sampling lanes A, B and C on the terrain covered by the cross-shaped channel pattern in accordance with time-delay response (TDR), amplitude monopulse (AM) and phase monopulse (PM) modes or operation.

14. The altimeter system of claim 13, wherein the PM mode of operation utilizes interferometric Doppler beam-sharpening.

15. The altimeter system of claim 13, wherein the AM mode of operation is implemented through a misalignment in the overlapping antenna patterns to create an amplitude radio variation as a function of cross-track position in each lane.

16. The altimeter system of claim 13, wherein the TDR mode of operation is implemented by analyzing the terrain in multiple channels within the same lane.

* * * * *